United States Patent
Elms et al.

(10) Patent No.: US 9,815,002 B2
(45) Date of Patent: Nov. 14, 2017

(54) APPARATUS AND METHOD FOR GAS-LIQUID SEPARATION

(71) Applicant: HAVEN TECHNOLOGY SOLUTIONS LLC, Magnolia, TX (US)

(72) Inventors: David James Elms, Magnolia, TX (US); Gregory Allen Hudspeth, Amarillo, TX (US)

(73) Assignee: HAVEN TECHNOLOGY SOLUTIONS LLC, Magnolia, TX (US)

(*) Notice: Subject to any disclaimer, the term of this patent is extended or adjusted under 35 U.S.C. 154(b) by 0 days.

(21) Appl. No.: 15/138,085

(22) Filed: Apr. 25, 2016

(65) Prior Publication Data

US 2016/0236115 A1 Aug. 18, 2016

Related U.S. Application Data

(63) Continuation of application No. 13/841,881, filed on Mar. 15, 2013, now Pat. No. 9,320,989.

(51) Int. Cl.
  *B01D 19/00* (2006.01)
  *E21B 21/06* (2006.01)

(52) U.S. Cl.
  CPC ..... *B01D 19/0042* (2013.01); *B01D 19/0063* (2013.01); *E21B 21/067* (2013.01)

(58) Field of Classification Search
  CPC ............... B01D 19/00–19/0495; E21B 21/067
  USPC .................................. 96/155–220, 296–397
  See application file for complete search history.

(56) References Cited

U.S. PATENT DOCUMENTS

2005/0150827 A1* 7/2005 Hopper ............... B01D 21/10
                                                                    210/512.1
2012/0199000 A1   8/2012 Elms et al.

FOREIGN PATENT DOCUMENTS

CN          1250389 A      4/2000
WO    WO-2012040252 A2     3/2012

OTHER PUBLICATIONS

The State Intellectual Property Office of the People's Republic of China, Office Action, dated Sep. 21, 2016, 10 pages, China.
The State Intellectual Property Office of the People's Republic of China, Office Action, dated Sep. 21, 2016, 15 pages, English Translation, China.

* cited by examiner

*Primary Examiner* — T. Bennett McKenzie (57) ABSTRACT

A multi-phase separation apparatus shapes fluid flow in a flow shaping line preferably shaped to have a plurality of loops with consecutively decreasing diameters. Shaping the two-phase flow drives the heavier, denser fluids to the outside wall of the flow shaping line and allows the lighter, less dense fluids such as gas to occupy the inner wall of the flow shaping line. With the gas positioned on the inner wall, an exit port on the inner wall permits a majority, if not all, of the gas, along with a minimal amount of liquid, to be diverted to a conventional gas-liquid separator at a flow rate much lower than the total flow rate within the flow shaping line. The remaining liquid flow in the flow shaping line is subsequently introduced into an adjustable phase splitter to separate different liquid components from one another.

14 Claims, 11 Drawing Sheets

APPARATUS AND METHOD FOR GAS-LIQUID SEPARATION

The present application is a continuation patent application of U.S. patent application No. 13/841,881, filed on Mar. 15, 2013, the benefit of which is claimed and the disclosure of which is incorporated herein by reference in its entirety.

FIELD OF THE INVENTION

The present invention generally relates to the separation of components in a multi-phase flow stream. More specifically, it relates to restructuring flow regimes by a flow shaping apparatus so that the majority of a particular fluid component in a flow stream is located in a certain area of the flow stream, which allows for effective separation of the various fluid components.

BACKGROUND OF THE INVENTION

Figure 1A:
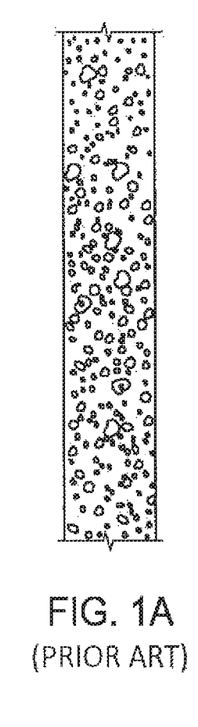
FIGS. 1A-1E illustrate a cross-sectional view of various flow regimes of two phase gas-liquid flow.
Figure 1B:
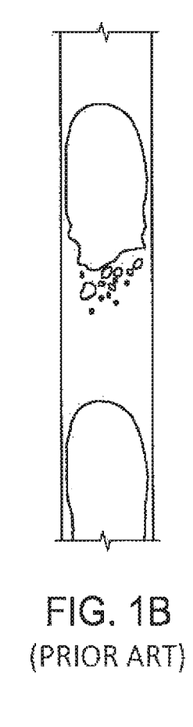
Figure 1C:
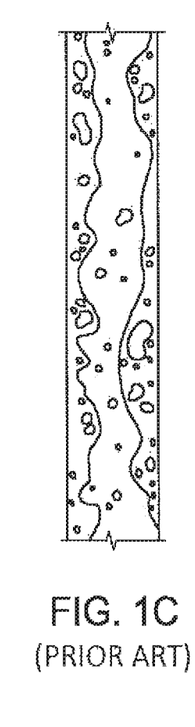
Figure 1D:
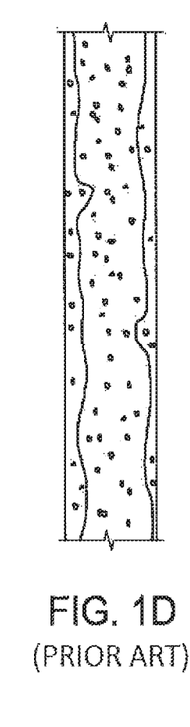
Figure 1E:
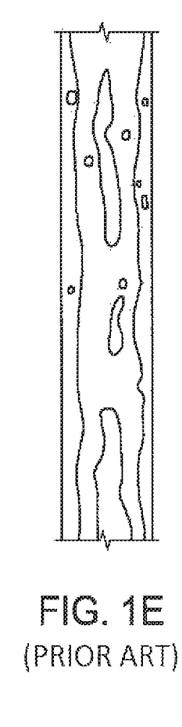

A gas-liquid two phase flow stream includes a mixture of different fluids having different phases, such as air and water, steam and water, or oil and natural gas. Moreover, the liquid phase of a fluid flow stream may further comprise different liquid components, such as oil and water. A gas-liquid two phase flow takes many different forms and may be classified into various types of gas distribution within the liquid. These classifications are commonly called flow regimes or flow patterns and are illustrated in FIGS. 1A-1E. Bubble flow as illustrated in FIG. 1A is typically a continuous distribution of liquid with a fairly even dispersion of bubbles in the liquid. Slug or plug flow as illustrated in FIG. 1B is a transition from bubble flow where the bubbles have coalesced into larger bubbles with a size approaching the diameter of the tube. Churn flow as illustrated in FIG. 1C is a pattern where the slug flow bubbles have connected to one another. In annular flow as illustrated in FIG. 1D, liquid flows on the wall of the tube as a film and the gas flows along the center of the tube. Finally, in wispy annular flow as illustrated in FIG. 1E, as the liquid flow rate is increased, the concentration of drops in the gas core increases, leading to the formation of large lumps or streaks of liquid.

It is often desirable to separate the gas and liquid components of a fluid from one another to enable proper operation of systems, such as certain types of liquid pumps. Conventional vertical or horizontal gas-liquid separators are available to separate gas from liquid. Conventional separators typically employ mechanical structures, wherein an incoming fluid strikes a diverting baffle which initiates primary separation between the gas and liquid components. Mesh pads or demister pads are then used to further remove suspended liquid. The sizing of a separator and the particular characteristics of the separator is dependent upon many factors, which may include, the flow rate of the liquid, the liquid density, the vapor density, the vapor velocity, and inlet pressure. Vertical separators are typically selected when the vapor/liquid ratio is high or the total flow rate is low. Horizontal separators are typically preferred for low vapor/liquid ratio or for large volumes of total fluid.

One application of these types of separators is in oil and gas drilling operations. Specifically, a mud-gas separator is used when a kick is experienced in a wellbore during drilling operations. A kick is the flow of formation fluids into the wellbore during drilling operations. If a kick is not quickly controlled, it can lead to a blow out. As part of the process for controlling a kick, the blow-out preventors are activated to close the wellbore and wellbore fluids are slowly circulated out of the wellbore while heavier drilling fluids are pumped into the wellbore. A mud gas separator is used to separate natural gas from drilling fluid as the wellbore fluid is circulated out of the wellbore. Often times, however, prior art separators, have limited capability to process flow streams with high volumes and/or high flow rates, such as those characteristic of wellbores.

Of course, separators are also used in the production of oil and gas to separate natural gas from oil that is being produced. Additionally, there are many other applications that require the use of gas-liquid separators. For example, when supplying fuel to ships, known as bunkering, air is often entrained in the fuel, causing an inaccurate measurement of the transferred fuel. Likewise, in oil production or production of other liquids, transferring or conveying a liquid may result in the liquid acquiring entrained gas during that process, a result observed in pipelines with altered terrains. In this regard, entrained gasses can prevent the accurate measurement of a liquid product, whether it is fuel transferred during bunkering or a liquid flowing in a pipeline.

SUMMARY OF THE INVENTION

One aspect of the invention relates to shaping multi-phase mixed flow using a curvilinear flow line formed in multiple loops or coils prior to separation of a fluid component from the flow path. Shaping the multi-phase flow into a curvilinear path will allow centrifugal force to more readily force the heavier, denser liquid to the outside or outer diameter wall of the flow shaping line in the curved path and allow the lighter, less dense vapor or gas to flow along the inside or inner diameter wall of the flow shaping line. In certain embodiments, once a flow regime has been restructured within the flow line, the flow component collected adjacent a particular wall of the line can be removed. For example, in flow streams characterized by a larger liquid component, the gas component of a liquid-gas flow stream will collect along the inner diameter wall of the curved flow shaping line, where the gas can be drawn or driven into an exit port located on the inner wall, thereby permitting a majority, if not all, of the gas, along with a low amount of liquid, to be sent to a conventional gas-liquid separator. The separated fluid will have a comparatively higher ratio of gas to liquid than the primary flow stream in the flow line, but will pass into the conventional gas separator at a flow rate much lower than the total flow rate within the flow shaping line. This permits for efficient separation of the gas from the liquid with the use of a smaller, more economical conventional gas-liquid separator than what would have been required for the full flow stream and/or higher flow rates.

In certain embodiments, a curvilinear flow line, whether in the form of a single loop or multiple loops, may be utilized in conjunction with a sensor for controlling an adjustable valve. In each case of multiple loops, the loops in the flow line permit an extended residence time of a flow stream through the system. A sensor disposed along the flow path is utilized to estimate a property of the flow 12, such as for example, the percentage or "cut" of one or more components of the flow steam. The adjustable valve is positioned sufficiently downstream so that the valve can be timely adjusted based on the measurement from the sensor. For example, a sensor measuring cut can be utilized to adjust the position of a weir plate in the flow stream, thereby increasing or decreasing the amount of fluid separated from the flow stream. Although the sensors as described herein will be primarily described as measuring the cut, other types of sensors may also be utilized. Likewise, the type of cut sensors are not limited to a particular type, but may include the non-limiting examples of interface meters; optics or capacitance sensors. The extended residence time of the flow stream in the multi-loop system permits the valve to be adjusted once the cut is determined, thereby enhancing separation of fluid components once the flow stream has been restructured in accordance with the invention. The adjustable valve may be, for example, be a weir plate, foil or similar structure that can be used to draw off or separate one component of the flow stream. Other types of adjustable valves may also be utilized.

In certain embodiments of a multi-loop system, the primary diameter of one or more loops or coils generally disposed along an axis may be altered along the length of the axis to control the flow rate through the system. In certain embodiments, the flow line will include a plurality of loops formed along an axis, with each successive loop having a smaller primary diameter than the preceding loop, such that the velocity of the flow stream within the flow line increases along the axis while maintaining flow regime separation. Likewise, in certain embodiments, the flow line will include a plurality of loops formed along an axis, with each successive loop having a larger primary diameter than the preceding loop, such that the velocity of the flow stream within the flow line decreases along the axis.

In certain embodiments of a multi-loop system, two sets of loops or coils may be utilized along a flow path. The first set of loops will function to separate a component, such as gas, as described above. The second set of loops functions to address any gas that remains in the flow stream. In certain embodiments, prior to introduction of the flow stream into the second set of loops, the flow stream may be agitated so as to thereafter enhance flow regime reshaping as described above.

Additionally, a fluid guiding surface may be placed on the inner wall of the flow shaping line at the exit port to further aid in directing the gas to flow to the conventional gas separator.

Furthermore, the liquid return from the conventional gas-liquid separator may be arranged in close downstream proximity to the exit port on the inner wall of the flow shaping line. The close proximity of the liquid return and the exit port allows the use of a venturi, nozzle or other restriction located adjacent the liquid return in the flow shaping line just downstream of the exit port. The venturi, nozzle or other restriction accelerates the velocity of the liquid in flow shaping line as it flows across the exit port. This acceleration of the liquid helps to pull the liquid out of the conventional gas-liquid separator. In addition, the acceleration of the liquid within the flow shaping line helps to prevent any solids that may be present in the gas-liquid flow from entering the exit port and it helps to lower the amount of liquid that enters the exit port and thus enters the conventional separator.

In certain embodiments, a heater may be disposed along a flow stream prior to flow regime reshaping in order to cause a phase change of at least a portion of the fluid within the flow stream. For example, certain liquid hydrocarbons in flow stream may be converted to gas under an applied heat in order to enhance separation of the hydrocarbon from the flow steam as described above. Such a heater may be utilized with curvilinear flow line having either single and multi-loops.

Likewise, in certain embodiments, a curvilinear flow line having either single and multi-loops may be utilized in conjunction with a liquid-liquid phase separator. The liquid-liquid phase separator is preferably deployed down stream of the exit port and is disposed to separate different density liquids from one another. In certain embodiments, the liquid-liquid phase separator may be adjustable and utilized in conjunction with a sensor. The sensor is disposed along the flow path downstream of the gas exit port and is utilized to estimate the percentage or "cut" of various liquids remaining in the flow steam. The phase separator can be adjusted based on the cut. The phase separator may include, for example, an adjustable weir plate, adjustable foil, adjustable valve or similar adjustable mechanism. In one embodiment, the phase separator may include an adjustable valve in the form of rotatable ball having two flow passages therethrough. Rotation of the ball adjust the positions of the flow passages relative to the liquid-liquid flow stream, exposing more or less of a particular passage to the flow steam. Other types of adjustable valves may also be utilized.

In another embodiment of the invention particularly suited for flow streams with a high gas content, i.e., "wet gas", a flow channel is formed along at least a portion of the inner diameter wall of a curvilinear flow line as described herein. The liquid within the wet gas will collect in the flow channel and can be drained off from the primary flow stream.

In another embodiment of the invention, the gas-liquid separator includes a variable position gas control valve that maintains level control of a vessel and establishes a constant flow pressure throughout the system.

The invention therefore allows a multi-phase fluid to be effectively separated with the use of a smaller conventional separator than was previously possible. The invention accomplishes this without using additional complex mechanical devices and thus will operate efficiently and reliably.

BRIEF DESCRIPTION OF THE DRAWINGS

A more complete understanding of the present disclosure and advantages thereof may be acquired by referring to the following description taken in conjunction with the accompanying figures, wherein.

DETAILED DESCRIPTION

In the detailed description of the invention, like numerals are employed to designate like parts throughout. Various items of equipment, such as pipes, valves, pumps, fasteners, fittings, etc., may be omitted to simplify the description. However, those skilled in the art will realize that such conventional equipment can be employed as desired.

Figure 2:
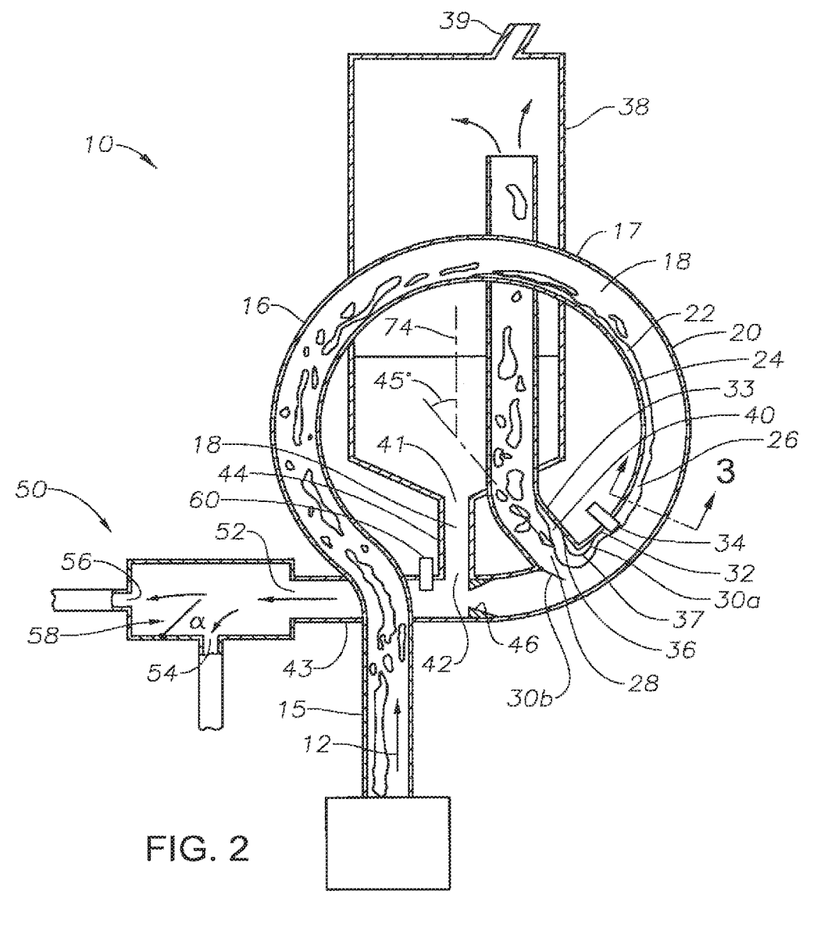
FIG. 2 illustrates a cross-sectional view of an embodiment of separation apparatus with a flow regime modification loop/coil and a liquid-liquid phase splitter.

FIG. 2 illustrates a cross-sectional view of an embodiment of a separation apparatus 10. In an exemplary embodiment, the separation apparatus 10 is in fluid communication with a main flow line 15 in which a multi-phase flow 12 is traveling. The multi-phase flow 12 could be any type of multiphase gas-liquid flow regime or flow pattern, such as, for example, bubble flow, slug or plug flow, churn flow, annular flow or wispy annular flow. Moreover, the multi-phase flow may include two components within a single phase, such as water and oil within the liquid phase. The multi-phase flow 12 within main line 15 is directed into a curvilinear flow path 16 in a flow shaping line 17. In certain embodiments, such as is illustrated in FIG. 2, the curvilinear flow path 16 is substantially in the form of a loop having a circular shape, although the curvilinear flow path may have other curvilinear shapes. In any event, the curvilinear flow path 16 of flow shaping line 17 creates an increased distribution of a first phase 22, such as gas, along the inner wall 24 of the flow shaping line 17. The increased distribution of this first phase 22 along the inner wall 24 of the flow shaping line 17 results in part by the relatively heavier and denser second phase 18, such as a liquid, of flow 12 being forced to the outer wall 20 of the flow shaping line 17 due to centrifugal force of curvilinear flow path 16, while the lighter first phase 22 is driven to the inner wall 24. The flow shaping line 17 may be disposed in any orientation, including substantially in a vertical plane or a horizontal plane. In embodiments with a vertical or partly vertical orientation of the flow shaping line 17, gravitational effects may also aid in increasing the distribution of the first phase 22 on the inner wall 24 of the flow shaping line 17.

Figure 3:
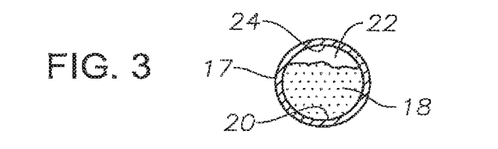
FIG. 3 illustrates an elevation view of the embodiment of the separation apparatus with a plurality of flow regime modification loops/coils of descending cross-sectional diameter.

As the multi-phase flow 12 continues to travel through the curvilinear flow path 16 of flow shaping line 17, the multi-phase flow 12 forms a flow path that exhibits a high concentration of gas 22 along the inner wall 24 of the flow shaping line 17. In the embodiment shown in FIG. 2, at location 26, which is approximately 315 degrees around shaping line 17 (or 45 degrees from the vertical), the separation of gas 22 from liquid 18 has reached a degree that gas 22 primarily occupies the space adjacent the inner wall 24 of the flow shaping line 17. As seen in FIG. 3, which is a cross section 3-3 of the flow shaping line 17 and multi-phase flow 12 at location 26, the gas 22 occupies mainly the inner wall 24 of the circular flow path 16 of the flow shaping line 17 while the liquid 18 primarily travels along the outer wall 20.

With gas-liquid flow 12 forming a more stratified flow regime, or at least the distribution or volume of gas near the inner wall 24 of the flow shaping line 17 has increased at the point of location 26, the gas 22 may be effectively bled off from the gas-liquid flow 12 at an outlet port 28 positioned along the inner wall 24 of the flow shaping line 17, preferably along a curvilinear portion of flow shaping line 17. In this regard, although outlet port 28 may be positioned anywhere along flow path 16, it is preferably selected to be at a point where substantial separation of gas from liquid has occurred. Thus, in one preferred embodiment, the outlet port 28 is downstream of location 26. At about a location 26, which is approximately at an angle of approximately 45 degrees from a vertical axis 74 or otherwise, approximately 315 degrees about a circular flow path, it has been found that the concentration, separation or stratification of the gas 22 from the liquid 18 is at a point that gas 22 occupies a greater volume of space adjacent the inner wall 24 of the main line 15 than liquid 18. In other embodiments, the outlet port 28 may be located between generally 45 degrees from the vertical and generally zero degrees with the vertical. While location 26 is illustrated at approximately 315 degrees around flow shaping line 17 and has been found to be a point where a substantial volume of gas has been driven to inner wall 24, location 26 is used for illustrative purposes only. In this regard, in configurations with multiple loops formed by flow shaping line 17, the outlet port 28 may be disposed along an inner wall of any one of the loops, including the first loop, the last loop or an intermediate loop.

In an exemplary embodiment, a fluid guiding surface 30 is located at the outlet port 28. In certain embodiments, a fluid guiding surface 30a may be located on the inside diameter 32 of the inner wall 24 of the flow shaping line 17 upstream of the outlet port 28. The fluid guiding surface 30 includes a downstream end 36 that curves around the corner 37 located at the junction of the outlet port 28 and the flow shaping line 17. The gas 22 follows the contour of the fluid guiding surface 30a and the gas 22 will follow the curve of the downstream end 36 into the outlet port 28. In another embodiment, a fluid guiding surface 30b may comprise a weir plate, foil or similar separation mechanism disposed to direct gas 22 into outlet port 28. The fluid guiding surface 30b functions to guide the gas 22 into the outlet port 28. In certain embodiments, fluid guiding surface 30b is adjustable in order to adjust the position of fluid guiding surface 30b, and hence, the first phase cut removed from flow stream 12. A sensor 34 may be disposed to operate in conjunction with and control adjustable fluid guiding surface 30b based on a measured property of the flow stream 12, such as cut. Although sensor 34 may be located anywhere along main line 15 or flow shaping line 17, it has been found that sensor 34 is preferably separated a sufficient distance from outlet port 28 to permit the position of adjustable fluid guiding surface 30b to be adjusted once the cut of flow 12 has been determined. Likewise, in certain embodiments, sensor 34 is disposed along flow shaping line 17 at a point where substantial phase separation has taken place, such as at 26, thereby increasing the accuracy of sensor 34.

An amount of liquid 18' from the gas-liquid flow 12 will also be carried into the outlet port 28 thus forming a new gas-liquid flow 40 which includes a much lower percentage of liquid 18' compared to the liquid 18 in gas-liquid flow 12. The new gas-liquid flow 40 from outlet port 28 is then directed into a conventional gas-liquid separator 38, as shown in FIG. 2, for further separation of the gas and liquid. Outlet port 28 is connected to the conventional gas-liquid separator by separator inlet line 33. The gas-liquid separator 38 contains a gas exit 39 to permit removal of gas 22 separated from flow stream 12. The gas-liquid separator 38 also contains a liquid exit 41. In certain embodiments, liquid exit 41 that may be in fluid communication, via a line 44, with flow shaping line 17 or a subsequent flow line 43 disposed at the end of the flow shaping line 17. Those skilled in the art will appreciate that separation apparatus 10 is shown as integrated with gas liquid separator 38, but can be a completely separate structure.

In an exemplary embodiment, the liquid inlet port 42 is in close downstream proximity to outlet port 28 with a venture or similar restriction 46 formed therebetween along the flow path of liquid 18 flow. The restriction 46 accelerates the velocity of the liquid 18 as it flows across the liquid inlet port 42. This acceleration of liquid 18 lowers the pressure of the liquid 18 flow in the primary flow path below that of the liquid 18' in line 44, thereby drawing liquid 18' out of the conventional gas-liquid separator 38. In addition, the acceleration of the liquid 18 facilitates separation of gas from liquid within flow shaping line 17, minimizes the likelihood that any solids present in the gas-liquid flow 12 will enter outlet port 28, and minimizes the amount of liquid 18 that enters the outlet port 28.

In certain preferred embodiments, venturi 46 is adjustable, permitting the velocity of the flow therethrough, and hence the pressure drop across the venturi 46, to be adjusted in order to control the amount of liquid 18' drawn from conventional gas-liquid separator 38. This in turn, permits the pressure of the gas within gas-liquid separator 38, as well as the proportional amounts of liquid and gas therein, to be controlled. This is particularly desirable when gas void fraction to liquid is a higher percentile. To eliminate bypass of gas that might pass extraction point 28.

As mentioned above, the efficient first step in the separation of the gas 22 from the liquid 18 significantly decreases the amount of liquid 18 entering the conventional gas-liquid separator 38. This allows for the use of much smaller size conventional gas-liquid separators than would have previously been possible for a given flow rate and/or flow volume.

While circular flow path 16 is shown as positioned in a vertical plane, in another embodiment the circular flow path 16 could be in a horizontal plane (see FIG. 12) or in a plane with an inclination between horizontal and vertical.

In certain embodiments, as further illustrated in FIG. 2, a phase splitter 50 is in fluid communication with flow shaping line 17 to receive the liquid 18 flow therefrom. Phase splitter 50 may be in direct fluid communication with flow shaping line 17 or may be in communication with a flow line 43 disposed between the phase splitter 50 and flow shaping line 17. In this regard, a flow line 43 may be utilized to stratify multiple liquid components within liquid 18 by stabilizing the fluid flow. For example, flow line 43 may be horizontally disposed so that liquids 18a with a first density, such as oil, separate from liquids 18b with a second density, such as water, by virtue of gravitational effects acting thereon. Alternatively, additional loops in flow shaping line 17 may be utilized to stratify the liquid components 18a, 18b.

Phase splitter 50 includes a housing having a liquid inlet 52 for receipt of liquid 18, as well as a first liquid outlet 54 and a second liquid outlet 56. A weir plate, foil or similar separation mechanism 58 is disposed within phase splitter 50 to direct a portion of the liquid 18 into first outlet 54 and allow a portion of the liquid 18 to pass into second outlet 56. For example, weir plate 58 may be disposed to direct a substantial portion of liquid component 18b into first outlet 54, while allowing liquid component 18a to pass over weir plate 58 into second outlet 56. In this way, separation apparatus 10 may be used not only to separate gas from liquid, but also to separate liquid from liquid in instances where gas and multiple liquids comprise flow stream 12.

In certain embodiments, separation mechanism 58 may be adjustable in order to adjust the position of separation mechanism 58, and hence, the cut of liquid removed from liquid 18. Non-limiting examples of an adjustable separation mechanism 58 include an adjustable valve, adjustable weir plate or adjustable foil. A sensor 60 may be disposed to work in conjunction with and control an adjustable separation mechanism 58 based on a measured property of liquid 18, such a cut. Although sensor 60 may be located anywhere along main line 15 or flow shaping line 17 or line 43, it has been found that sensor 60 is preferably separated a sufficient distance from separation mechanism 58 to permit the position of separation mechanism 58 to be adjusted once the property of flow 12 has been determined. Likewise, in certain embodiments, sensor 60 is disposed along flow shaping line 17 or line 43 at a point where substantial liquid stratification has taken place, thereby increasing the accuracy of sensor 60. In certain embodiments, sensor 34 and sensor 60 may be a single sensor utilized for multiple functions, such as to identify the cut of gas, a first liquid and a second liquid in flow 12.

Figure 4:
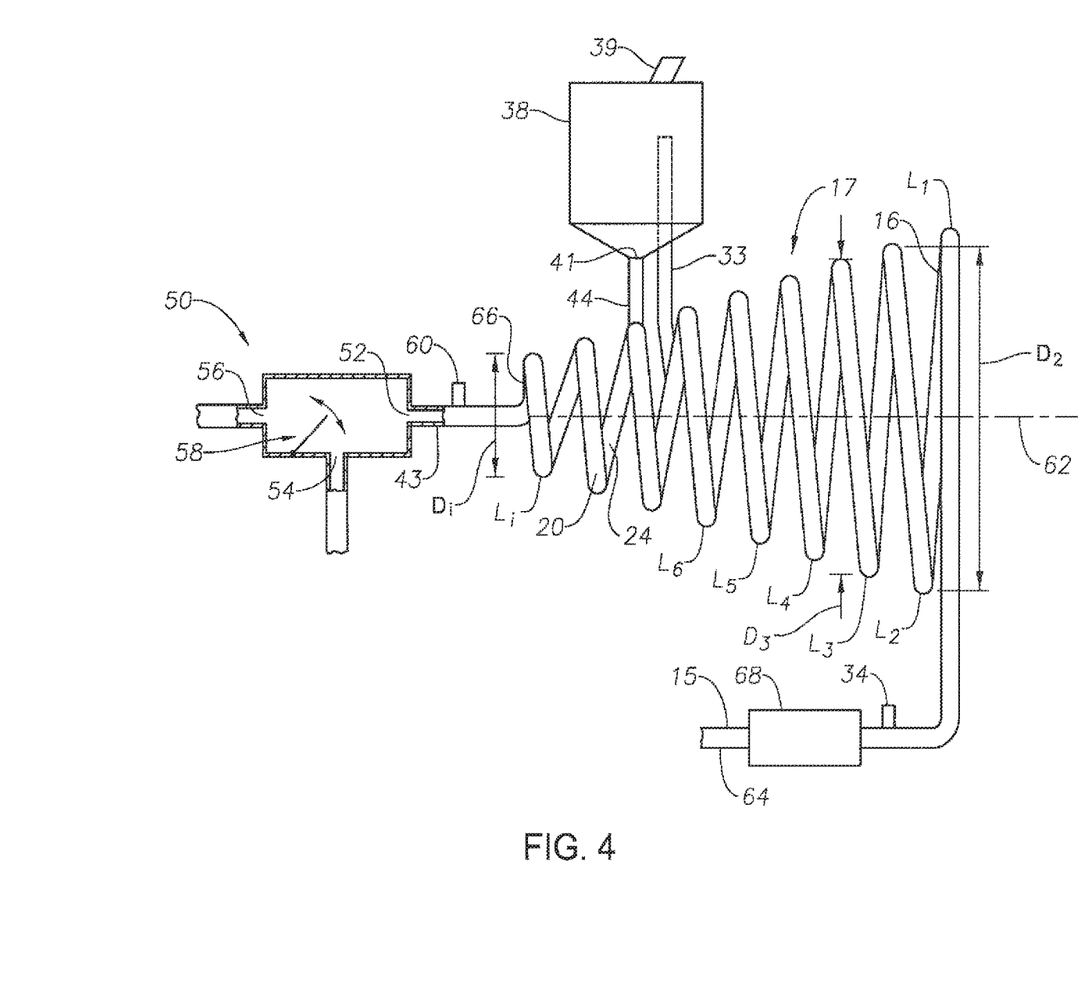
FIG. 4 illustrates an elevation view of the embodiment of the separation apparatus with a plurality of flow regime modification loops/coils having successively decreasing diameters and a liquid-liquid phase separator.

Turning to FIG. 4, other embodiments of the invention are illustrated. In certain embodiments, the curvilinear flow path 16 is substantially in the form of a plurality of loops $L_1 \ldots L_i$, each loop characterized by a diameter $D_1 \ldots D_i$ that together comprise flow shaping line 17. The loops L are disposed along an axis 62. In certain embodiments, the diameter D of the loops L may remain substantially constant along the length of axis 62, while in other embodiments, the diameter of the loops may increase or decrease, either randomly or successively. In the illustrated embodiment, the diameter D of successive loops decrease along the length of the flow shaping line 17 from the first end 64 to the second end 66 of flow shaping line 17.

The plurality of loops L may be provided to develop the increased concentration of the gas 22 on the inner wall 24 of the flow shaping line 17. Moreover, the plurality of loops L increases the residence time of the flow 12 or liquid 18 through flow shaping line 17. It may be desirable, for example, to increase residence time of the flow 12 or liquid 18 through the system 10 in order to measure the flow or liquid with sensors, such as the sensors 34, 60 described above, and make adjustments to adjustable mechanisms 30b, 58 based on the measurements prior to the flow 12 or liquid 18 reaching the adjustable mechanism. For example, the phase splitter 50 may be adjusted to separate liquid 18 into multiple phases, or the foil 30b may be adjusted to separate gas 22 from flow 12.

In this same vein, it may be desirable to alter the rate of the flow 12 or liquid 18 through system 10. This is achieved by increasing or decreasing the diameter D of the loops L to achieve a particular flow rate for a particular deployment of system 10. In one embodiment, for example, the diameter D of the loops L is decreased, resulting in an increase in velocity of the flow 12 from first end 64 to second end 66 which thereby results in greater centrifugal force and increased concentration of the gas 22 on the inner wall 24 of the flow shaping line 17.

Sensors 34 and 60 may be disposed anywhere along the flow path of system 10 as desired. Likewise, outlet 28 along inner wall 24 may be positioned anywhere along flow shaping line 17, the position being selected as desired based on the components of flow 12. Thus, outlet 28 may be positioned in the first loop L1 or a subsequent loop L, as illustrated. Likewise, liquid inlet port 42 may be in fluid communication with flow shaping line 17 or line 43 at any point in order to reintroduce liquid 18' from separator 38 back into the main liquid 18 stream.

FIG. 4 also illustrates an optional phase splitter 50 utilized in conjunction with the flow shaping line 17 shown. FIG. 4 also illustrates an optional heater 68 utilized in conjunction with flow shaping line 17. Heater 68 is particularly useful when the flow 12 includes certain liquid components which are desirably removed as a gas utilizing system 10. For example, certain liquid hydrocarbons, such as methane or gasses that might move from liquid to gas at different flash or boiling temperatures, may be present in a flow 12 recovered from a wellbore (see FIG. 11). Rather than recover the hydrocarbons as liquids, it may be desirable to heat the flow 12 using heater 68 to a temperature where the hydrocarbons convert to gas 22, after which the hydrocarbon gas 22 can be removed through outlet port 28 and separator 38.

Figure 5:
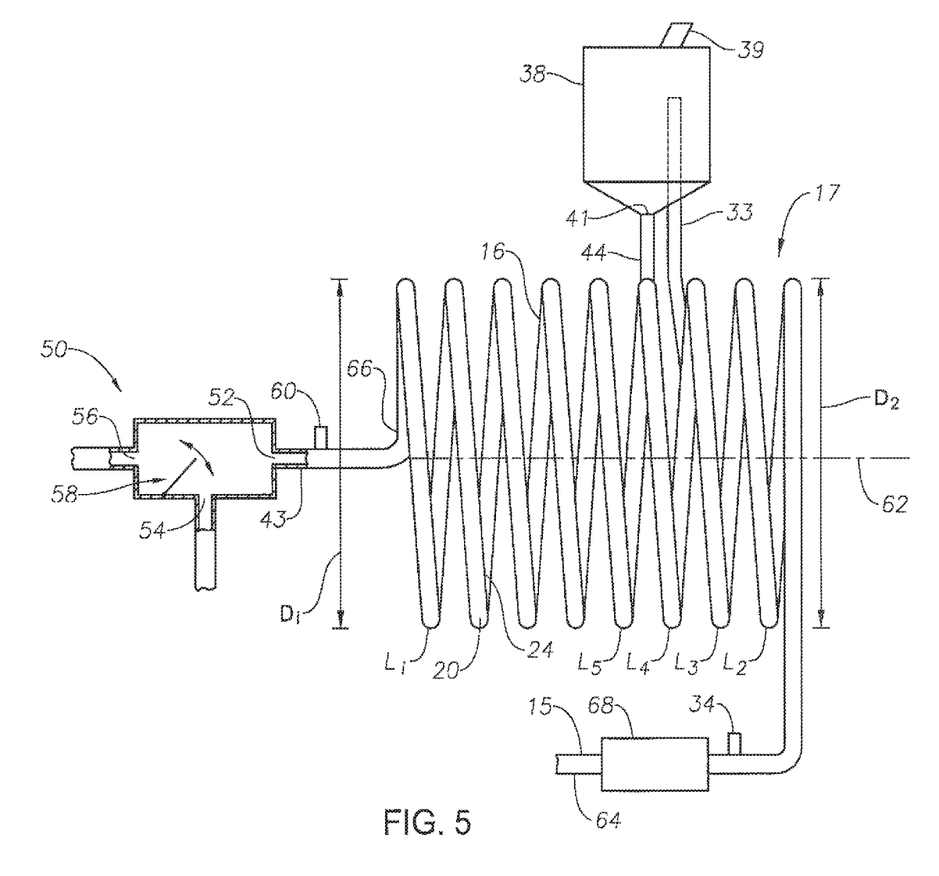
FIG. 5 illustrates an elevation view of the embodiment of the separation apparatus with a plurality of flow regime modification loops/coils having substantially the same diameters and a liquid-liquid phase separator.

FIG. 5 illustrates the system 10 shown in FIG. 4, but with all of the loop diameters D approximately the same dimension. In the embodiment of FIG. 5, residence time may be maintained while the adjustable mechanism 58 in phase splitter 50 is adjusted based on one of the sensors 34, 60.

Figure 6A:
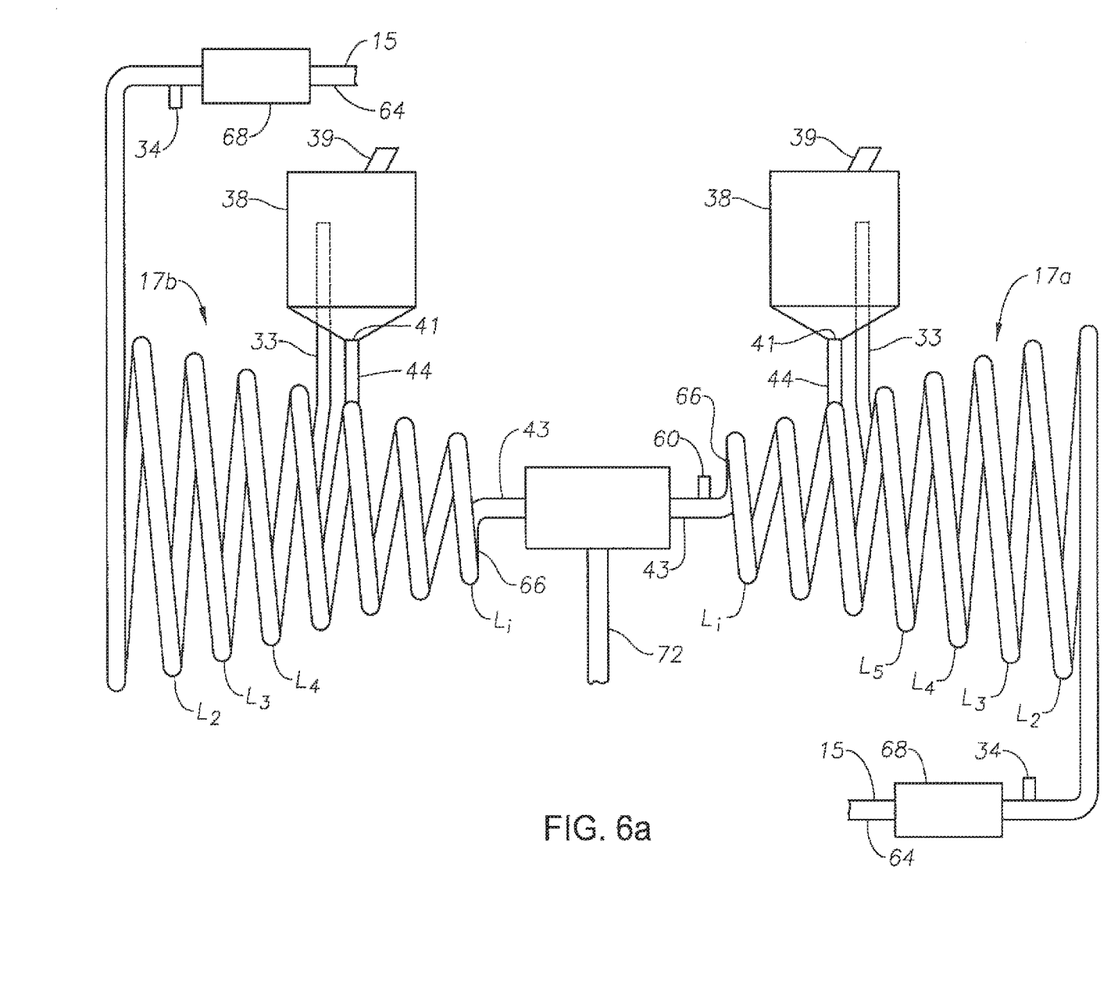
FIG. 6a illustrates an elevation view of the embodiment of the separation apparatus with two sets of flow regime modification loops/coils of FIG. 4.
Figure 6B:
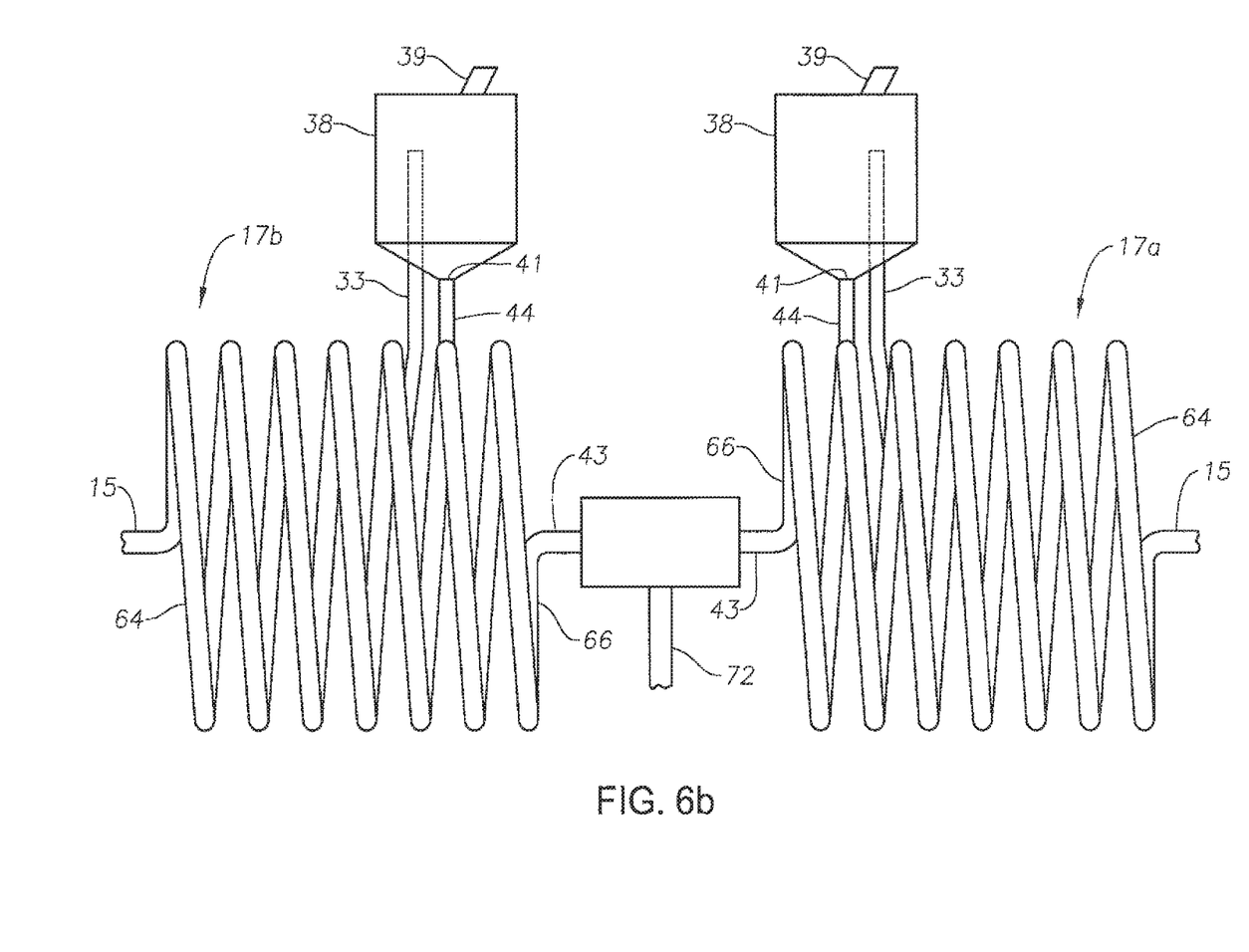
FIG. 6b illustrates an elevation view of the embodiment of the separation apparatus with two sets of flow regime modification loops/coils of FIG. 5.

FIG. 6a illustrates the multi-loop system 10 shown in FIG. 4, but with two sets of loops. In this case, a first flow shaping line 17a and a second flow shaping line 17b are illustrated. Flow shaping lines 17a, 17b each have multiple loops L, which loops L may have substantially the same diameter D or successively increasing or decreasing diameters D. The flow can be divided and processed in parallel so that portions of the flow stream are simultaneously processed as described above, after which, the liquid from each set of loops can be recombined and directed towards outlet 72. Multiple sets of loops arranged in parallel are particularly useful in cases of large flow volume The system 10 of FIG. 6b is the same as that of FIG. 6a, but the loops L have substantially the same diameter D. The system of FIG. 6b may also be used in conjunction with a heater 68, cut sensors and adjustable cut mechanism 30b as described herein.

Figure 7:
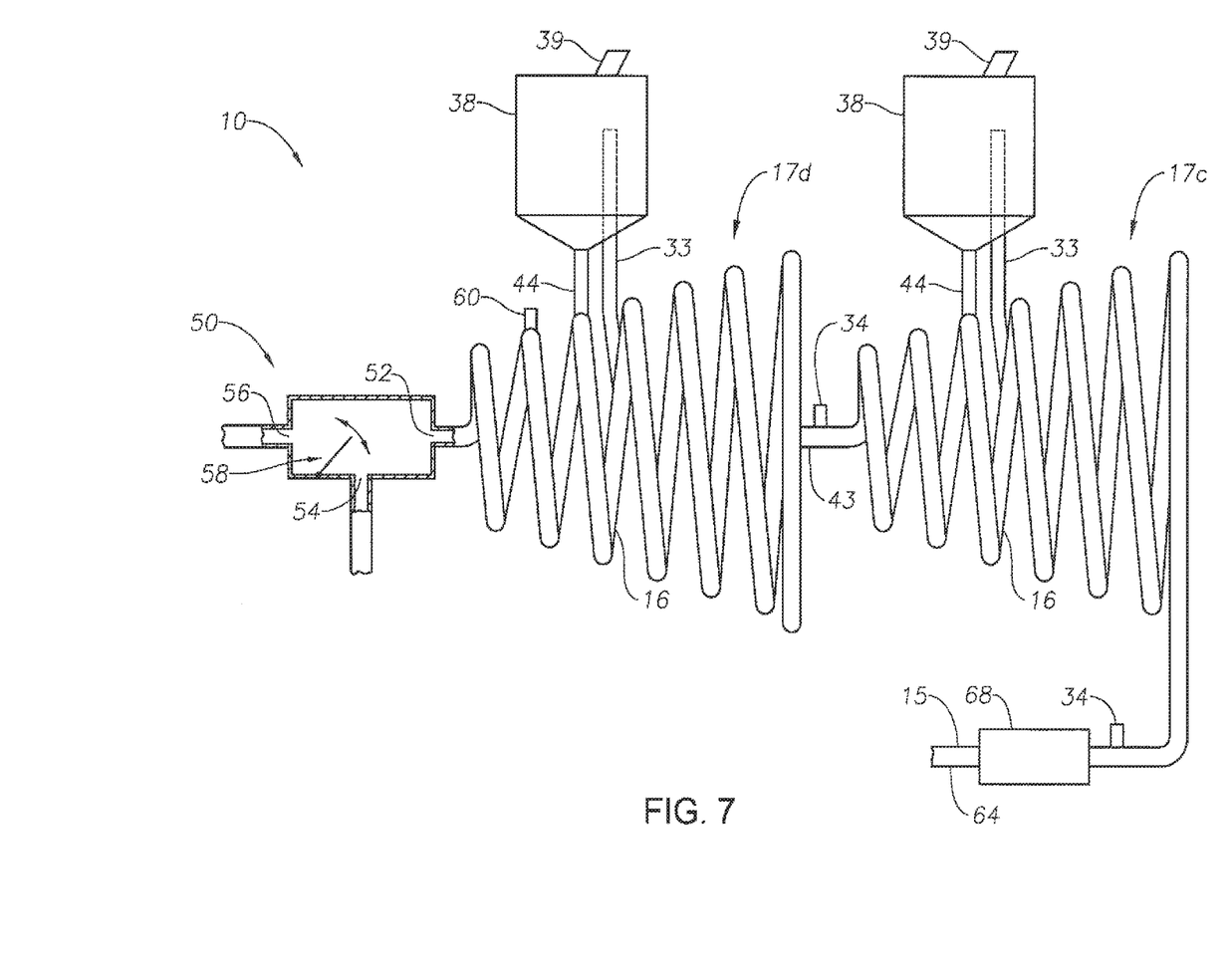
FIG. 7 is an elevation view of a multi-phase flow separation apparatus utilizing two sets of loops/coils of FIG. 4, arranged in series.

With reference to FIG. 7, system 10 includes two sets of loops arranged in series. In this case, a first flow shaping line 17c and a second flow shaping line 17d are illustrated. Flow shaping lines 17c, 17d each have multiple loops L, which loops L may have substantially the same diameter D or successively increasing or decreasing diameters D. In the illustrated embodiment, in each set of loops, the loops L have a gradually decreasing diameter along the curvilinear flow path 16. A heater 68 may be disposed to convert part of the flow 12 to a gaseous phase. Outlet port 28 to line 33 leading to separator 38 is positioned along the flow shaping line 17c at a point where it is expected a substantial amount of phase separation to have occurred after passing through at least a portion of the curvilinear flow path 176. A sensor 34 is positioned in order to measure a property of the flow 12. Sensor 34 is spaced apart along flow shaping line 17c a sufficient distance to allow the flow 12 to have a residence time in the loops prior to reaching outlet port 28 positioned on inner wall 24, thereby permitting an adjustable separation mechanism, such as 30b shown in FIG. 2, to be adjusted accordingly. First flow shaping line 17c is intended to remove a large portion of the gas 22 that comprises fluid flow 12. Thereafter, the liquid 18 passes through line 43 and into the second flow shaping line 17d to remove remaining gas that may be within the flow exiting the first flow shaping line 17c. Again, a sensor 34 may be utilized in conjunction with an adjustable separation mechanism adjacent outlet port 28 of second flow shaping line 17d.

In one configuration of the system 10 shown in FIG. 7, flow shaping lines 17d operates as describe in FIG. 2, passing a liquid comprised of substantially first and second liquid components 18a, 18 b into phase splitter 50. A sensor 60 may be disposed along flow shaping line 17d to control an adjustment mechanism 58 disposed within phase splitter 50.

Multiple sets of loops are particularly useful in cases of large flow volume. The flow can be divided and processed in parallel so that portions of the flow stream are simultaneously processed as described above, after which, the liquid from each set of loops can be recombined and directed towards outlet 72.

Figure 8:
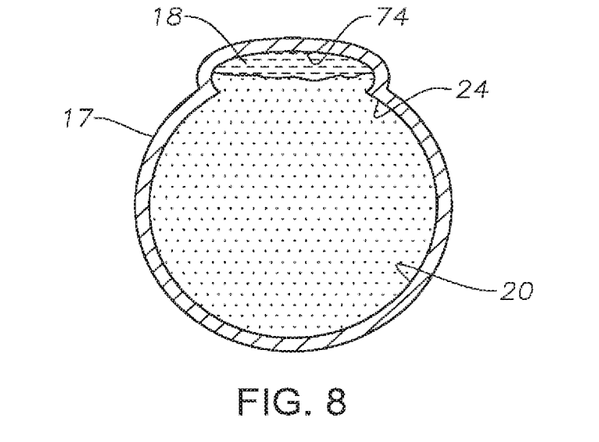
FIG. 8 illustrates a cross-sectional view of a flow regime modification loop/coil for wet gas processing.

Turning to FIG. 8, another embodiment of a flow shaping line 17 is illustrated. In this embodiment, flow shaping line 17 is shown in cross section and includes a channel 74 formed along the inner wall 24 of at least a portion of the curvilinear flow path 16. Channel 74 may be utilized in any configuration of a flow shaping line 17 having a curvilinear portion, including flow shaping line formed in both single loop and multiple loop arrangements. It has been found that such systems 10 having a channel 74 are particularly effective in multi-phase flow regimes with a high gas to liquid content. In other words, flow 12 is comprised primarily of gas 22, with a relative low amount of liquid 18 suspended therein. As flow 12 follows the curvilinear shape of flow shaping line 17, the liquid 18 will become trapped within channel 74 and can be drained off through an outlet port 28 disposed along channel 74. Thereafter, the separated liquid may be introduced into a second curvilinear flow shaping line 17 without a channel xx to permit separation of gas from liquid as depicted and discussed in the foregoing embodiments and illustrations.

Figure 9:
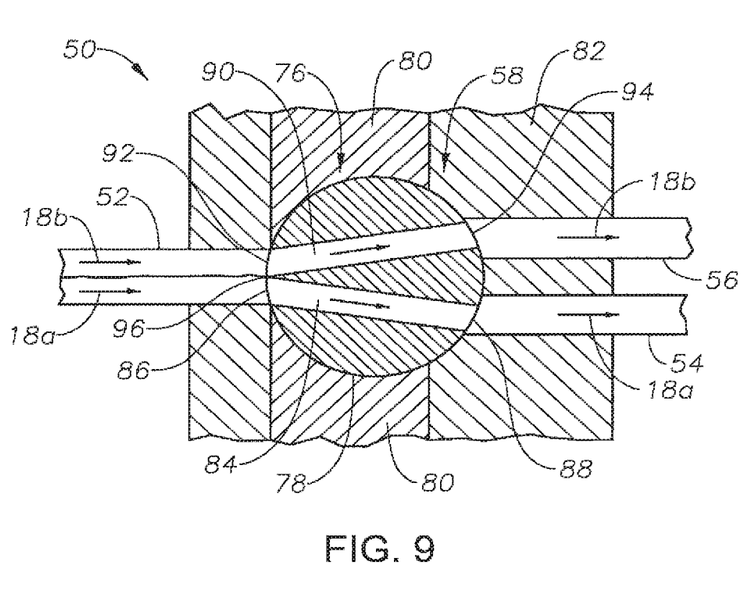
FIG. 9 illustrates a cross-sectional view of another embodiment of a liquid-liquid phase splitter with an adjustable valve.

FIG. 9 illustrates one embodiment of an adjustable separation mechanism 58 for use in phase splitter 50. Adjustable separation mechanism 58 is a ball valve 76 having a ball 78 rotatably mounted in a ball seat 80 carried within a phase splitter housing 82. Ball 78 includes a first passageway 84 having an inlet 86 and an outlet 88, as well as a second passageway 90 having an inlet 92 and an outlet 94. Passageways 84 and 90 are formed in ball 78 so that inlets 86, 92 are adjacent one another, while outlets 88, 94 are spaced apart from one another. In one embodiment, passageways 84, 90 converge at inlets 86, 92 so that a portion of ball 78 defining passageways 84, 90 forms an edge 96. As previously described, phase splitter 50 includes a liquid inlet 52, a first outlet 54 and a second outlet 56. Ball valve 76 is disposed in seat 80 so that the inlets 86, 92 are adjacent fluid inlet 52, first ball outlet 88 is in fluid communication with first outlet 54 and second ball outlet 94 is in fluid communication with outlet 56. In a preferred embodiment, edge 96 is positioned adjacent inlet 52. Rotation of ball 78 thereby adjusts the position of edge 96 in liquid stream 18 as liquid stream 18 flows across edge 96. In this way, valve 76 can be adjusted to alter the cut from liquid steam 18 such that a portion of the liquid 18a flows through first passageway 84 and a portion of the liquid 18b flows through the second passageway 90. Persons of ordinary skill in the art will understand that passageways 84, 90, and their respective inlets 86, 92 may be sized so that valve 76 may also be adjusted to divert all of liquid 18 flowing though inlet 52 into either first or second passageway 84, 90, as desired.

Figure 10:
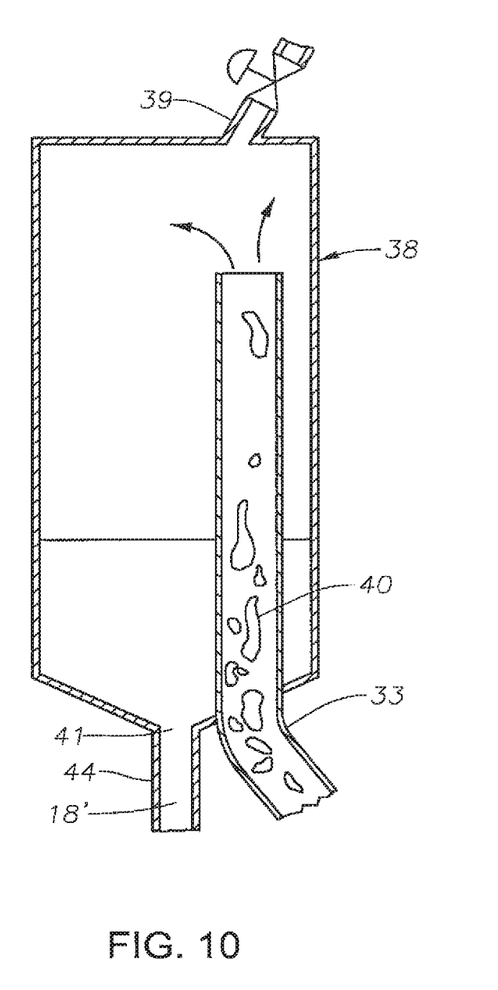
FIG. 10 illustrates a cross-sectional view of a gas control valve in a gas separation tank.

With reference to FIG. 10, a variable position gas control valve 98 is placed on the gas outlet 39 side of the two-phase separation vessel 38. The liquid outlet 41 is unregulated and allowed to drain. As gas is allowed to escape the level increases in the vessel and when gas is not allowed to escape the level decreases. The incoming flow 40 is controlled and maintained at a specific level in separator 38 in order to stabilize the pressure therein so that liquid full flow bypass can be maintained without peeks or fluctuations in flow rate.

Figure 11:
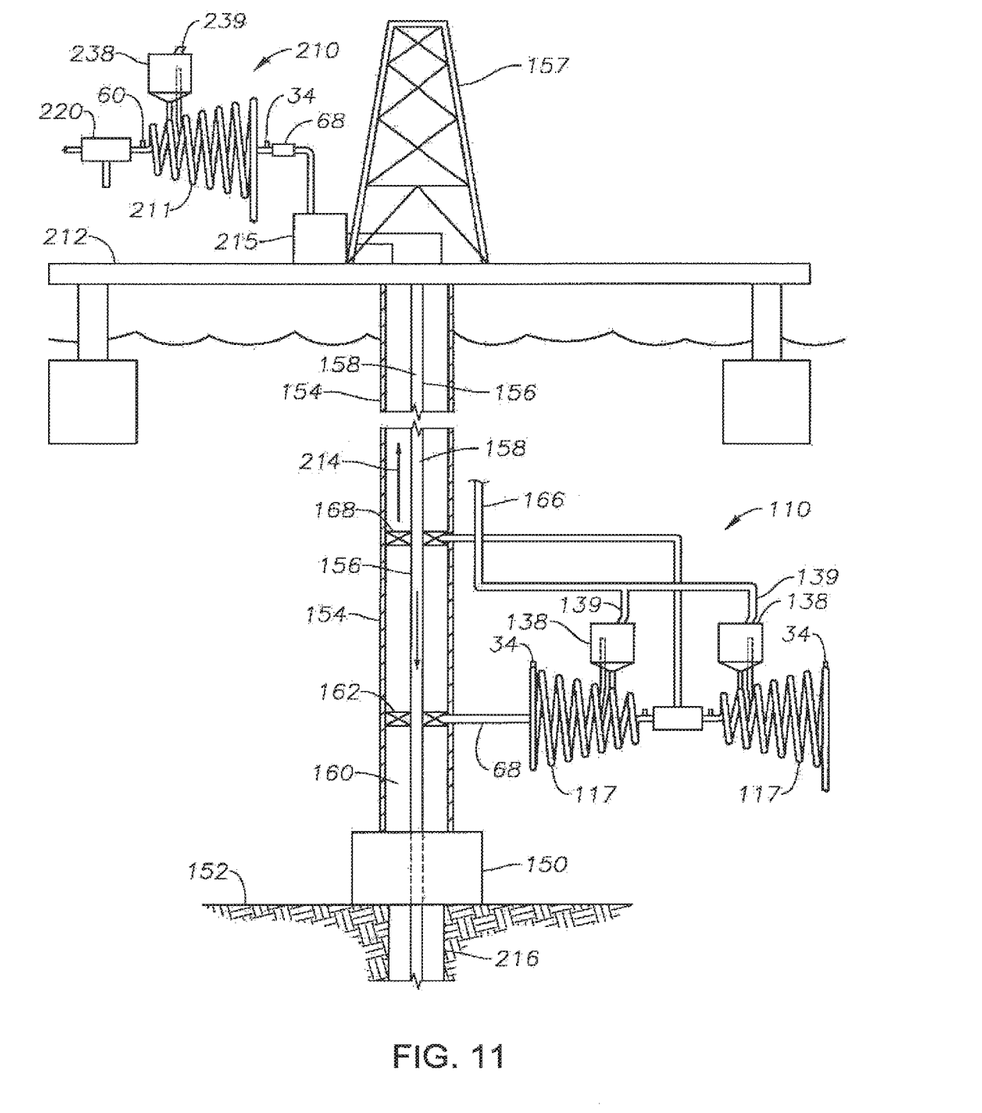
FIG. 11 illustrates an elevation view of another embodiment of separation apparatus deployed in oil and gas drilling operations.

As described above, one application for the invention is to protect against "kicks," such as in subsea applications, by circulating out hydrocarbon gas at the seabed floor before the gas is able to rise up to a drilling rig. Referring to FIG. 11, in an exemplary embodiment, illustrated is a conventional sub-sea blow out preventer 150 located on the seafloor 152. A marine riser 154 extends from the blow out preventer 150 and within the riser is a drillpipe 156. One embodiment of the separation apparatus 110 is positioned along drillpipe 156, preferably adjacent the blow out preventer 150. In normal drilling operations, drilling fluid 158 is pumped down the drillpipe 156 from the drilling rig 157 and returns to the drilling rig 157 via annulus 160 formed between the drillpipe 156 and the riser 154. If a "kick" is detected, such as by cut or similar sensors described herein, inlet annulus valve 162 is activated, diverting returning drilling fluid 158 from annulus 160 into the flow shaping line 117. Flow shaping line may have one or multiple sets of coils. In the case of a single set of coils, flow shaping line is preferably arranged so that successive loops L along the line 117 having a decreasing diameter. In the case of multiple sets of coils, the flow shaping lines 117 may be arranged in parallel. Natural gas entrained in drilling fluid 158 from the "kick" is then separated from the drilling fluid 158 by the separation apparatus 110 as described above. Specifically, gas will exit flow shaping line 117 into a separator 138. The natural gas then exits the gas-liquid separator 138 at the gas exit 139 and may flow up riser 166 to the drilling rig where it may be safely handled, for example, sent to a flare boom of the drilling rig 157, or compressed and re-distributed (also not shown).

Following separation of natural gas from the recovered drilling fluid 158 by separation apparatus 110, the drilling fluid 158 is re-introduced into the annulus 160 at an exit annulus valve 168. In comparison with the usual procedure of handling a kick, the use of an embodiment of this invention allows for full flow or circulation of the drilling fluid without having to choke down the flow or operate the blow out preventer valves.

In another embodiment, the inlet annulus valves 162 or exit annulus valves 168 can be eliminated, bypassed or operated so that the upward flowing drilling fluid 158 continually flows through the separation apparatus 110. Compared to the usual procedure on a drilling rig when there is a kick of choking the flow of the drilling fluid and being able to only send a portion of the flow to the mud-gas separator located on the drilling rig, an embodiment of the present invention allows the full flow of the drilling fluid to be handled by the separation apparatus 110 and the separation safely takes place near the seafloor.

In one embodiment, flow shaping line 117 may comprise multiple loops of decreasing diameter as described above and illustrated in FIG. 11. In other embodiments, flow shaping line 117 may comprise a single loop or multiple loops of substantially the same diameter, but utilized in conjunction with a heater 68 to convert certain hydrocarbons to gas and/or a sensor 34 utilized in conjunction with an adjustable cut mechanism 30b (see FIG. 2), such as a foil, weir plate or valve.

In another embodiment illustrated in FIG. 11, a separation apparatus 210 having a flow shaping line 211 is utilized in conjunction with drilling and a hydrocarbon recovery system near the ground or water surface 212. A fluid flow (such as fluid flow 12 in FIG. 2) from a wellbore 216 is directed into flow shaping line 211 positioned adjacent a drilling rig 157. In normal drilling operations, drilling fluid 158 is pumped down a drillpipe 156 from the drilling rig 157 and returns to the drilling rig 157 via annulus 160 formed between the drillpipe 156 and a pipe 154, such as a riser in the case of marine drilling operations or a well casing in the case of land drilling operations. The recovered drilling fluid 158 from annulus 160 is directed into the flow shaping line 211. Preferably, drilling mud and cuttings are first removed from the flow 214 using various systems 215 known in the industry before introduction into flow shaping line 211. Natural gas entrained in drilling fluid 158 is then separated from the drilling fluid 158 by the separation apparatus 210 as described above. Specifically, gas will exit flow shaping line 211 into a separator 238. The natural gas 164 exits the gas-liquid separator 238 at the gas exit 239.

In one embodiment, flow shaping line 211 may comprise multiple loops of decreasing diameter as described above and illustrated in FIG. 4. In other embodiments, flow shaping line 211 may comprise a single loop or multiple loops of substantially the same diameter, but utilized in conjunction with a heater 68 to convert certain hydrocarbons to gas and/or a sensor 34 utilized in conjunction with an adjustable cut mechanism, such as a foil, weir plate or valve. Moreover, separation apparatus 210 may include a phase splitter 220 in fluid communication with line 211 and disposed to separate liquid components as described above.

Figure 12:
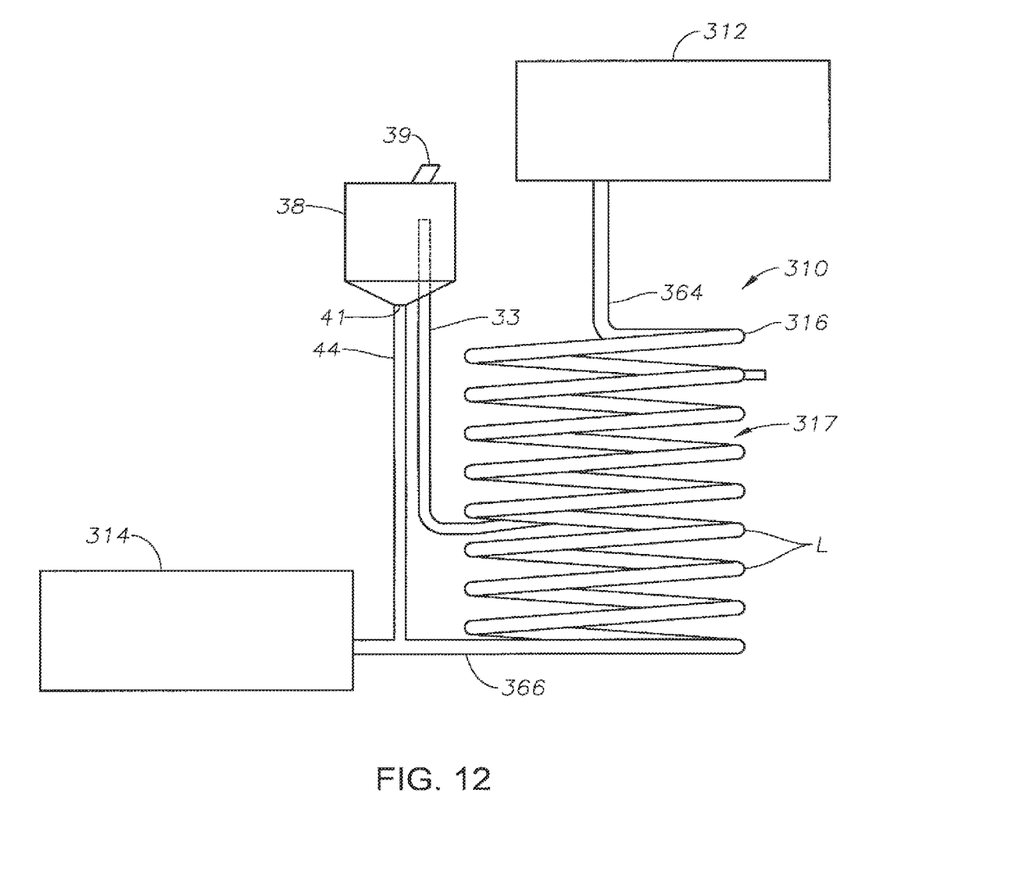
FIG. 12 illustrates an elevation view of another embodiment of separation apparatus deployed in fuel bunkering operations.

In another embodiment illustrated in FIG. 12, a multiphase flow separation apparatus 310 can be utilized in bunkering operations to supply ships with fuel. Bunker fuel generally refers to any type of fuel oil used aboard ships. Bunker fuels are delivered to commercial ships via bunker barges, which often hold the bunker fuel in large tanks 312. The practice of delivering bunker fuels is commonly referred to as "bunkering", as such bunker barges can also be known as bunkering barges. The bunker fuel is typically pumped from the barge's tanks 312 to the tanks 314 on commercial ships. At times, bunker fuels may be transferred between bunker barges. In any event, the pumping of fuel in bunkering operations, especially as the vessels containing the fuel are emptied, larger amounts of air tend to be drawn in and pumped with the fuel, rendering pumping difficult and resulting in inaccurate measurements of fuel. Thus, in certain embodiments, a system 310 is disposed in line between a first fuel storage vessel 312 and the vessel to which the fuel is being pumped, namely a second fuel storage vessel 314. While system 310 may be of many different configurations as described herein, in certain preferred embodiments, system 310 includes, as shown in FIG. 12, a curvilinear flow path 316 in a flow shaping line 317. Flow shaping line 317 includes a plurality of successive loops L of substantially the same diameter, each loop L being substantially horizontally disposed, thereby forming a "stack" of loops L. It has been found that in the case of loops L disposed substantially in the horizontal, the diameters of the loops, i.e., the coil sizes, do not need to be successively descending from the first end 364 of flow shaping line 317 to the second end 366 as is desirable in vertical orientation of the loops. Thus, fuel is removed from the first vessel 312, passed through system 310 and then directed to the second vessel 314. The fuel entering the first end 364 of flow shaping line 317 may have a large proportion of air included with the liquid fuel. The liquid fuel exiting the second end 366 of flow shaping line 317 has been substantially scrubbed of the entrained air.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A fuel bunkering apparatus comprising;
a bunkering barge holding a first fuel storage tank having an outlet;
a ship holding a second fuel storage tank having an inlet;
a flow shaping line having a curvilinear flow path defined between a first end of the flow shaping line and a second end of the flow shaping line, the first end in fluid communication with the outlet of the first fuel storage tank and a second end in fluid communication with the inlet of the second fuel storage tank, the flow shaping line having a plurality of curvilinear pipe loops arranged adjacent one another along an axis extending from a first axis end to a second axis end, each pipe loop characterized by an inner wall along which a gas component of a bunker fuel flowing through the flow shaping line will collect and an outer wall along which a liquid component of the bunker fuel flowing through the flow shaping line will collect;
a loop outlet port disposed along the flow shaping line downsteam of the first end and upstream of the second end;
a separator inlet line coupled to the loop outlet port such that the loop outlet port defines a junction between the separator inlet line and the flow shaping line; and
a gas separator in fluid communication with said loop outlet port through said separator inlet line such that fluid is capable of flowing into said gas separator through said separator inlet line.

2. The fuel bunkering apparatus of claim 1, wherein each of the loops is disposed in a horizontal orientation.

3. The fuel bunkering apparatus of claim 1, wherein the axis extends in a substantially vertical direction.

4. The fuel bunkering apparatus of claim 1, wherein each curvilinear pipe loop is characterized by a diameter, and wherein the diameter of at least one curvilinear pipe loop is the same as the diameter of at least another adjacent curvilinear pipe loop.

5. The fuel bunkering apparatus of claim 1, further comprising a liquid-liquid phase splitter, the liquid-liquid phase splitter comprising a first horizontal inlet connected to the second end of the flow shaping line downstream of said junction such that fluid is capable of flowing into said liquid-liquid phase splitter through the second end of the flow shaping line, and wherein the liquid-liquid phase splitter further comprises a first outlet connected to the second fuel storage tank, a second outlet and a first separation mechanism disposed between the first and second outlets.

6. A fuel bunkering method, comprising:
delivering a bunker fuel in a first fuel storage tank aboard a bunkering barge to a second fuel storage tank aboard a ship;
directing the bunker fuel from the first fuel storage tank to enter into a first end of a flow shaping line, through a plurality of curvilinear pipe loops defined in the flow shaping line arranged adjacent one another along an axis extending from a first axis end to a second axis end, and to exit out of the flow shaping line through a second end of the flow shaping line in fluid communication with the second fuel storage tank;
separating a gas from the bunker fuel along an inner wall of the plurality of curvilinear pipe loops defined in the flow shaping line; and
diverting the gas from the flow shaping line to a gas separator through a loop outlet port disposed along the flow shaping line downsteam of the first end and upstream of the second end.

7. The fuel bunkering method of claim 6, further comprising pumping the bunker fuel from the first fuel storage tank to the second fuel storage tank through the flow shaping line.

8. The fuel bunkering method of claim 7, wherein pumping the bunker fuel comprises drawing in air from the first storage tank as the first storage tank is emptied, and wherein separating the gas from the bunker fuel further comprises separating the air pumped from the first fuel storage tank with the bunker fuel.

9. The fuel bunkering method of claim 6, further comprising measuring a property of the bunker fuel within the flow shaping line.

10. The fuel bunkering method of claim 6, further comprising returning a liquid from the gas separator to the flow shaping line downstream of the loop outlet port.

11. The fuel bunkering method of claim 10, further comprising restricting the liquid from the bunker fuel between the loop outlet port and the second end of the flow shaping line to thereby accelerate the liquid from the gas separator.

12. The fuel bunkering method of claim 6, wherein directing the bunker fuel through a plurality of curvilinear pipe loops comprises directing the fluid in a generally vertical downward direction.

13. The fuel bunkering method of claim 6, wherein directing the bunker fuel through plurality of pipe loops comprises directing the bunker fuel through at least one pipe loop having substantially the same as the diameter of at least another adjacent pipe loop.

14. The fuel bunkering method of claim 6, further comprising coupling the flow shaping line between the first fuel storage tank and the second fuel storage tank and supplying the ship with fuel from the second fuel storage tank.

* * * * *